United States Patent [19]

Myers et al.

[11] Patent Number: 4,872,945
[45] Date of Patent: Oct. 10, 1989

[54] POST SEAL ETCHING OF TRANSDUCER DIAPHRAGM

[75] Inventors: Donald O. Myers, Carpentersville; Ruta J. Venclovas, Western Springs, both of Ill.

[73] Assignee: Motorola Inc., Schaumburg, Ill.

[21] Appl. No.: 90,433

[22] Filed: Aug. 24, 1987

Related U.S. Application Data

[63] Continuation of Ser. No. 878,453, Jun. 25, 1986, abandoned.

[51] Int. Cl.$^4$ ............................................. H04R 31/00
[52] U.S. Cl. ..................................... 156/627; 156/630; 156/633; 361/283; 73/718; 73/724; 29/594; 29/595
[58] Field of Search ...................... 29/25.41, 594, 595, 29/610 SG; 73/718, 724; 156/627, 630, 633; 361/283

[56] References Cited

U.S. PATENT DOCUMENTS

| | | | |
|---|---|---|---|
| 4,016,437 | 4/1977 | Calderara et al. | 310/8.7 |
| 4,238,662 | 12/1980 | Lao | 219/121 |
| 4,384,899 | 5/1983 | Myers | 148/1.5 |
| 4,586,109 | 4/1986 | Peters et al. | 361/283 |
| 4,617,606 | 10/1986 | Shat et al. | 361/283 |

FOREIGN PATENT DOCUMENTS

| | | | |
|---|---|---|---|
| 3445774 | 7/1985 | Fed. Rep. of Germany | 73/724 |
| 2059071 | 9/1979 | United Kingdom | 73/724 |

OTHER PUBLICATIONS

Websters Ninth New Collegiate Dictionary Merriam Webster Inc., Mass. 1985, pp. 48 and 1313.

Primary Examiner—Kenneth M. Schor
Assistant Examiner—L. Johnson
Attorney, Agent, or Firm—Phillip H. Melamed

[57] ABSTRACT

A process for manufacturing a pressure transducer of a pressure sensor is disclosed. Initially, a capacitive pressure transducer is formed by bonding a silicon diaphragm to a glass base such that the transducer produces different capacitances in response to different diaphragm deflections provided in response to sensed pressures. The sensitivity of the capacitive pressure transducer is adjusted by etching the silicon diaphragm while it is bonded to the base substrate in accordance with capacitance values of the transducer which were previously obtained at various predetermined pressures. In this manner, the thickness of the silicon diaphragm is selectively reduced to obtain an accurate desired sensitivity for the transducer and handling of very thin silicon diaphragms prior to their assembly to associated transducer bases is eliminated.

20 Claims, 2 Drawing Sheets

POST SEAL ETCHING OF TRANSDUCER DIAPHRAGM

This is a continuation of application Ser. No. 878,453, filed June 25, 1986, now abandoned.

CROSS REFERENCE TO RELATED APPLICATIONS

The present invention is related to the invention described in copending U.S. patent application Ser. No. 696,933, filed Jan. 31, 1985 now U.S. Pat. No. 4,617,606, entitled, "Capacitive Pressure Transducer", by Peter J. Shak and Roland K. Ho, having the same assignee as the present invention.

BACKGROUND OF THE INVENTION

The present invention is related to the field of manufacturing processes for force sensors which include a transducer (sensing element). More specifically, the present invention is related to the field of manufacturing processes for force sensors in which a relatively flexible diaphragm is bonded to a base to form a transducer and deflections of the diaphragm with respect to the base produced in response to sensed force result in varying electrical properties of the transducer which are representative of the sensed force. Preferably the sensed force corresponds to pressure.

Pressure transducers are known in which a relatively flexible diaphragm is bonded to a base and deflections of the diaphragm with respect to the base in response to sensed pressure results in altering electrical properties of the transducer. Such transducers can comprise either capacitive pressure transducers or resistive pressure transducers wherein in both cases deflection of the diaphragm with respect to the base results in altering either a capacitance or resistance output, respectively, of the transducer in response to sensed pressure. Such capacitive pressure transducers generally comprise either ceramic capacitive transducers, in which a thin ceramic plate having an electrode thereon is displaceable with respect to an electrode mounted on a base ceramic substrate, or silicon capacitive pressure transducers in which a silicon diaphragm, acting as one capacitor electrode, is selectively displaceable with respect to an electrode provided on a mating glass base. Copending U.S. patent application Ser. No. 696,933 referred to above and issued U.S. Pat. No. 4,384,899 to Myers both illustrate silicon capacitive pressure transducers corresponding to the above-noted structure. In the Myers patent, metallized vias in a glass base of the silicon capacitive transducer are utilized as electrical output connections for the capacitor electrodes. In the above-noted copending U.S. patent application, embedded wires in the base are utilized for the electrical output connections of the electrodes. In both cases, the silicon diaphragm is relatively thin with respect to the glass base, and the diaphragm and base are anodically bonded to form a transducer (sensing element) having a capacitance which varies as a function of sensed pressure.

In silicon capacitive pressure transducers, such as those discussed above, it has been found that to obtain a desired sensitivity of the transducer with respect to sensed pressure, the silicon diaphragm must be extremely thin. Prior silicon diaphragms are, therefore, either etched or ground to a predetermined relatively-thin thickness dimension prior to their being bonded to an associated glass base. However, this prior manufacturing technique required careful handling of the thin silicon diaphragm to prevent rupturing of the diaphragm during the manufacturing process. In addition, the sensitivity of the resultant transducer often did not correspond to theoretical predictions. This was due to manufacturing tolerances with respect to the thickness of the silicon diaphragm and might also be due to the fact that the anodic bonding of the silicon diaphragm to the glass base might be variable and thereby affect the transducer sensitivity. Therefore, the prior manufacturing process was not substantially efficient since pressure transducers having the desired sensitivity (capacitance or resistance variation as a function of pressure) could not be readily produced unless extreme manufacturing care was exercised and very close tolerances were instituted with regard to providing an exact thin silicon diaphragm and then bonding this diaphragm to a glass substrate.

SUMMARY OF THE INVENTION

An object of the present invention is to provide an improved manufacturing process for sensors which overcomes the above-noted deficiencies of the prior manufacturing processes.

In one embodiment of the present invention, a process for manufacturing a sensor is provided. This process comprises the steps of: providing a transducer by bonding a flexible diaphragm to a base to form said transducer, at least one electrical property of said transducer being varied in accordance with deflection of the diaphragm with respect to the base in response to sensed force; applying at least one predetermined reference force to the transducer; measuring said at least one electrical property of the transducer provided in response to the predetermined reference force; effectively calculating, based upon at least the measured one electrical property, a quantity corresponding to an amount of thickness reduction of the diaphragm needed to obtain a desired transducer characteristic; and thinning the transducer diaphragm while it is bonded to the base substrate to reduce the thickness of the diaphragm, wherein parameters of this thinning step are determined in accordance with the calculated quantity which in turn is determined in accordance with at least the measured one electrical property of the transducer. Preferably the force causing deflection of the diaphragm comprises the sensed pressure of a fluid which may be gaseous or liquid. Also, preferably the thinning step comprises etching the diaphragm to reduce its thickness, and the calculated quantity comprises either a desired amount of thickness reduction or an etch time duration needed to achieve a desired amount of thickness reduction.

The manufacturing process of the present invention provides for adjusting the thickness of a pressure transducer diaphragm after the diaphragm has been bonded to its associated transducer base. The adjustment of the diaphragm thickness then allows the obtaining of a desired pressure sensitivity for the transducer. The thickness reduction of the diaphragm is essentially implemented by determining the present pressure sensitivity of the transducer by subjecting the transducer to at least one predetermined reference pressure, then effectively calculating what amount of thickness reduction of the diaphragm would be needed to obtain a desired pressure transducer sensitivity. Once this calculation has been accomplished, the transducer diaphragm is then preferably etched, preferably without etching the base, so as to implement the desired thickness reduction of the diaphragm and thereby implement the desired pressure transducer sensitivity.

The present invention is specifically described in terms of a capacitive pressure transducer in which a desired transducer pressure sensitivity, as measured by changes in capacitance provided in response to changes in pressure, is achieved. However, the techniques of the present invention appear to be equally applicable to resistive or piezoresistive pressure transducers in which diaphragm deflection in response to sensed pressure is a function of diaphragm thickness. Also, while the present invention is discussed in terms of obtaining a desired sensitivity of the transducer with respect to sensed pressure, other transducer characteristics which depend upon diaphragm thickness can also be adjusted by utilization of the present manufacturing process. Such other characteristics can comprise adjusting the pressure at which a portion of the diaphragm will bottom out, contact, various portions of the base wherein such transducers are often utilized as pressure sensitive switches. In addition, transducers manufactured by the present invention could be used to sense any force, not just pressure, applied to the diaphragm to cause deflection. Thus, accelerometers could have their sensitivity adjusted in accordance with the present invention.

Essentially, the present invention involves adjusting the thickness of the diaphragm of the pressure transducer after the diaphragm has been bonded to the transducer base wherein the amount of this adjustment of thickness is determined in accordance with measured electrical properties of the transducer that exist prior to the thickness reduction of the transducer diaphragm. The advantages of the present invention involve utilization of conventional thickness silicon diaphragms such that handling of extremely thin diaphragms prior to bonding the diaphragm to its base is not required. This substantially reduces breakage of the diaphragm in the manufacturing process. In addition, the present invention allows obtaining a desired transducer characteristic, such as sensitivity, without utilization of extreme manufacturing tolerances with respect to the initial thickness of the diaphragm and/or the bonding process utilized to bond the diaphragm to the base. It should be noted that while anodic bonding is preferably utilized in the present invention, other types of bonding processes could be utilized such as the glass sealing ring conventionally utilized for the manufacture of ceramic capacitive pressure transducers.

BRIEF DESCRIPTION OF THE DRAWINGS

For a more complete understanding of the present invention, reference should be made to the drawings in which.

DESCRIPTION OF THE PREFERRED EMBODIMENTS OF THE INVENTION

Figure 1:
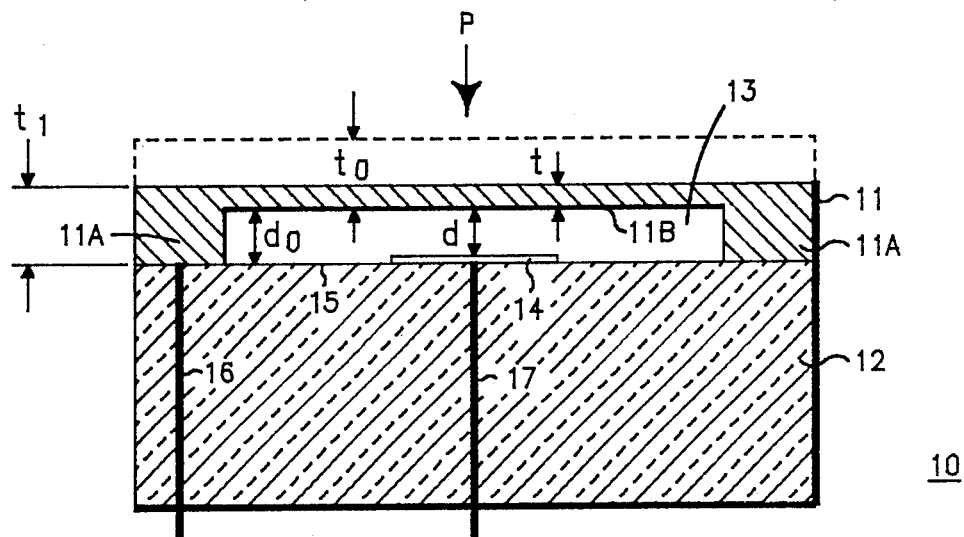
FIG. 1 is a cross-sectional schematic diagram of a pressure transducer manufactured by the manufacturing process of the present invention.

Referring to FIG. 1, a silicon capacitive pressure transducer 10 is illustrated. This pressure transducer can correspond to either the pressure transducers illustrated in U.S. Pat. No. 4,384,899 to Myers, or the pressure transducers illustrated in copending U.S. patent application 696,933 noted above. In either case, the pressure transducer preferably comprises a silicon diaphragm 11 which is anodically bonded to a glass base 12 comprising a glass substrate. The anodic bonding process, which is more fully described in the U.S. '899 Myers patent, results in hermetically bonding peripheral portions 11A of the silicon diaphragm to the base 12. The silicon diaphragm 11 has an effective central recessed portion 11B surrounded by the peripheral portions 11A. The anodic bonding process essentially provides an internal reference cavity 13 between the recessed portion 11B and the base 12 wherein a predetermined reference pressure is stored in this cavity 13. In response to sensed pressure P applied externally to the silicon diaphragm 11, the recessed portion 11B will be deflected downward and towards the base 12 with the amount of this deflection determined by the difference between the sensed pressure P and the reference pressure in the cavity 13. The pressure sensitivity of the transducer 10, which is defined as the amount of change of capacitance of the transducer 10 produced in response to a change in sensed pressure P, is primarily a function of the thickness t of the recessed portion 11B. The transducer 10 is part of a pressure sensor which includes additional components (not shown) and a protective housing (also not shown).

The silicon diaphragm 11 is doped such that it essentially acts as a conductor wherein the recessed portion 11B forms one electrode of a pressure sensing capacitor. An additional electrode 14 is provided on a top surface 15 of the base substrate 12 such that it is within the cavity 13 and the electrode 14 faces the recessed portion 11B. Electrical output connections 16 and 17 are provided for the pressure transducer 10 wherein the connection 16 passes through the base 12 and provides an external connection to the capacitor electrode comprising the diaphragm 11. The output connection 17 provides a similar output lead with respect to the capacitor electrode 14. The output connections 16 and 17 can comprise either metallized vias, as is the case in the Myers '899 patent, or can comprise embedded solid pins as shown in the copending U.S. patent application noted above.

It should be noted that at normal atmospheric pressure corresponding to 0 kilopascals (kPa), a nominal dimension d exists between the recessed portion 11B and the electrode 14, and this corresponds to the nominal capacitance of the pressure transducer 10. In response to sensed pressures P which exceed normal atmospheric pressure, this distance d will decrease resulting in an increased capacitance being provided on the output connections 16 and 17.

What is described above corresponds to the previously-known construction of silicon capacitive pressure transducers. These transducers are manufactured by first precisely controlling a critical thickness dimension t of the silicon diaphragm 11, and then precisely controlling the bonding of this silicon diaphragm to the base 12. While individual transducers can be manufactured, typically the most efficient manufacturing technique involves batch processing a number of such transducers wherein a number of individual silicon diaphragms 11 are provided on a single silicon wafer which is then anodically bonded to a number of individual bases 12 that are part of a large glass substrate. Subsequently, individual transducers are scribed and separated from other transducers. This batch processing of silicon wafers and glass substrates is essentially illustrated in the Myers '899 patent.

The manufacturing process utilized to previously create the capacitive transducer 10 shown in FIG. 1 required the handling of extremely thin silicon wafers since the critical dimension t typically had a magnitude of 5.5 mils (thousandths of an inch) in order to obtain the desired pressure sensitivity for the pressure transducer 10. This required extensive etching or lapping (grinding) production steps with regard to manufacturing the silicon diaphragm 11. Also, handling of this thin silicon diaphragm prior to its anodic bonding to the base 12 often resulted in breakage of the silicon wafer due to its extreme thinness. It should be noted that the typical silicon wafer used for integrated circuit chips has a thickness of 15 mils which is about 3 times as thick as the dimension t typically required for obtaining the desired pressure sensitivity. It should be noted that the nominal depth $d_o$ of the recessed portion 11B (prior to bonding the diaphragm to the base) is typically 5.2 microns, with 25.4 microns being equal to 1 mil. Thus the dimensions $d_o$ and t are not shown to scale in FIG. 1, and the dimension t approximately corresponds to the entire diaphragm thickness dimension $t_1$ shown in FIG. 1.

Essentially, the present invention involves bonding a relatively thick silicon diaphragm to the base 12, wherein the thickness of this initial silicon diaphragm corresponds to the thickness $t_0$ shown in FIG. 1. The diaphragm will still have the recessed portion 11B which, as before, is formed by selective etching prior to bonding the diaphragm to the base. Subsequently, the pressure sensitivity of the pressure transducer 10 is measured, and it is effectively determined how much thickness reduction of the silicon diaphragm 11 will be required in order to achieve a desired pressure sensitivity for the transducer 10. Then an etching step occurs wherein the time duration for this etching step is determined in accordance with the amount of thickness reduction desired for the silicon diaphragm 11 wherein this thickness reduction is, therefore, based upon the previously-measured sensitivity of the transducer 10. The resultant end structure is essentially the same as previous silicon capacitive transducers, but now handling of a very thin silicon diaphragm has been eliminated since the etching step has taken place after the silicon diaphragm has been bonded to its much thicker glass support base 12 so as to form the transducer 10. In addition, by starting with a relatively thick ($t_0$) critical dimension for the silicon diaphragm 11, and by utilizing the calculated etching time duration of the present invention, a precise pressure sensitivity for the transducer 10 can be implemented which is not a critical function of either the initial silicon diaphragm thickness $t_0$ or the bonding process by which the diaphragm 11 is bonded to the base 12. In prior manufacturing processes, both of these parameters were extremely critical and could result in loss of an entire wafer of pressure transducers. However, the present invention essentially compensates for any tolerance problems with regard to these two parameters since it effectively calculates the desired end thickness t, required for a desired pressure sensitivity, as a function of a measured pressure sensitivity of the silicon diaphragm 11 which has been bonded to the base 12. The process steps in FIGS. 2A and 2B which implement the present invention will now be discussed in detail.

Figure 2A:
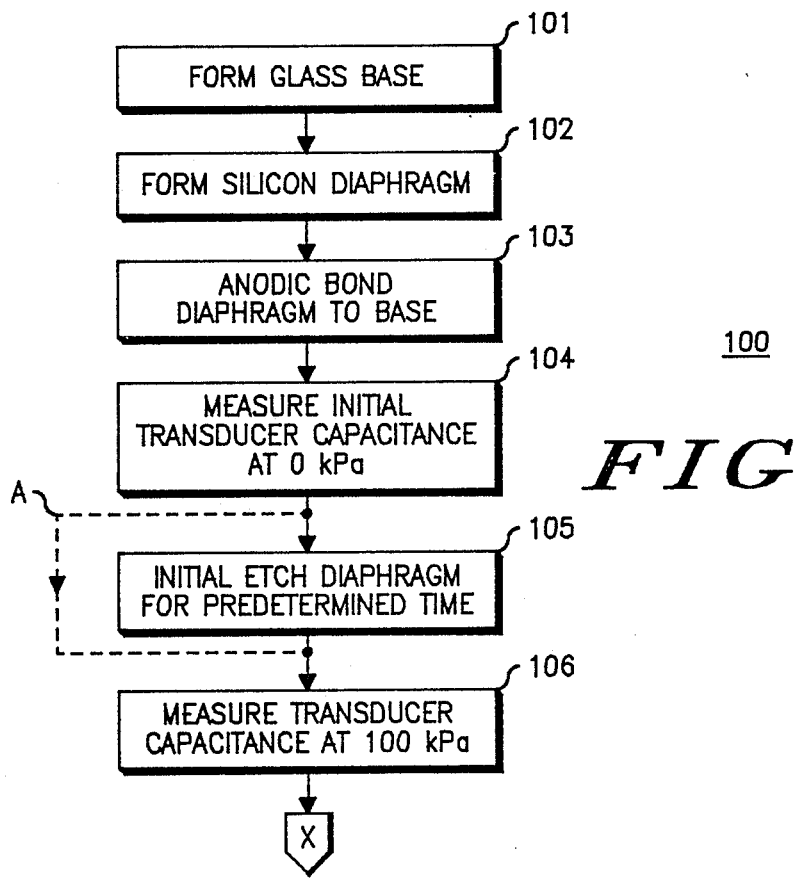
FIGS. 2A and 2B comprise a flowchart illustrating the basic steps of the manufacturing process of the present invention.
Figure 2B:
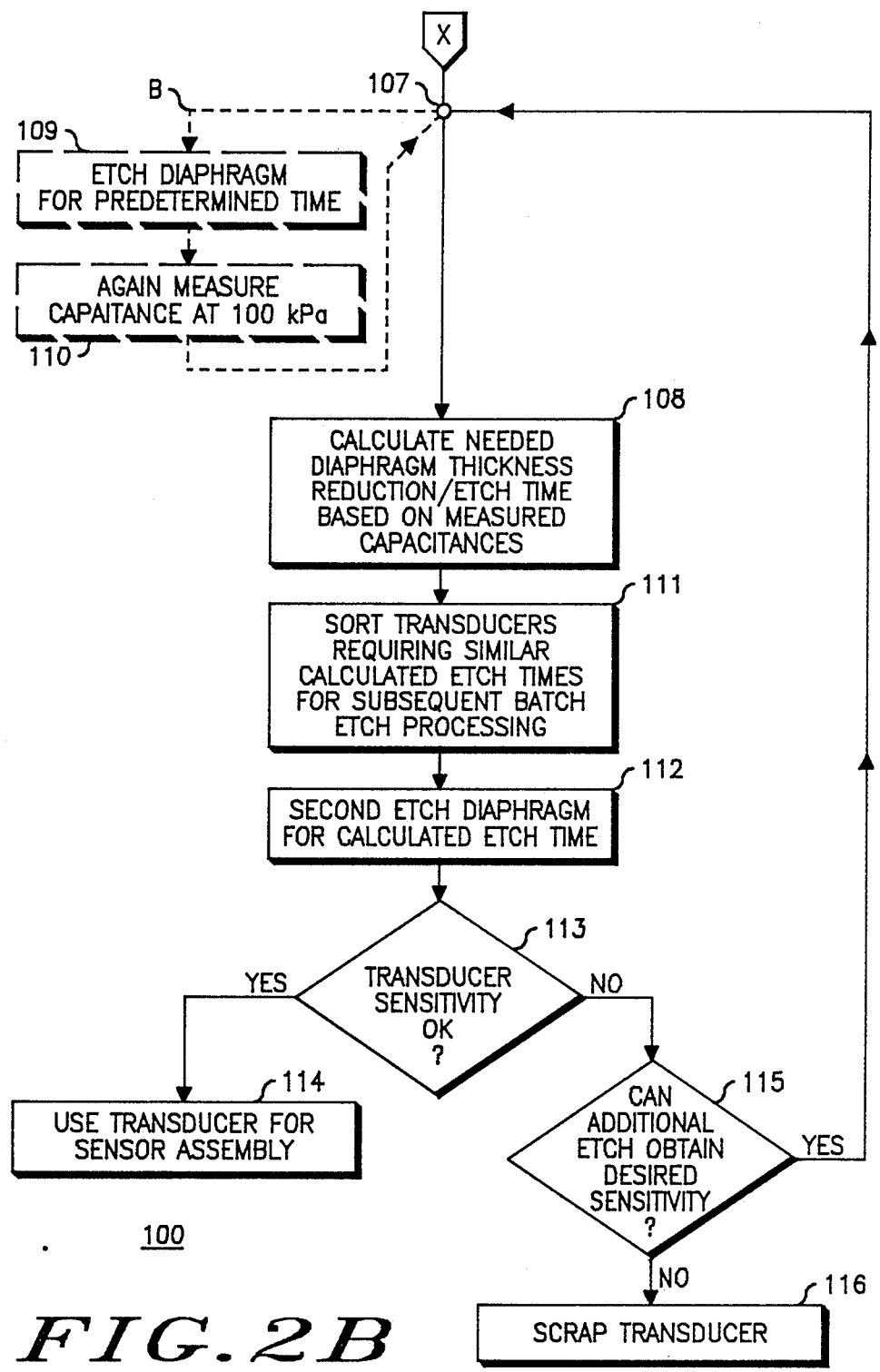

Referring to FIGS. 2A and 2B, a flowchart 100 of the manufacturing process of the present invention is illustrated. In an initial step 101, the glass base 12 is formed wherein preferably this also includes providing the glass base with the electrode 14 and the output leads 16 and 17 that are embedded therein. A process step 102 comprises forming the silicon diaphragm 11 wherein this silicon diaphragm will essentially have a conventional silicon wafer thickness of 15 mils, rather than the extremely thin silicon diaphragms previously utilized for manufacturing pressure transducers. The diaphragm 11 will still have the recessed portion 11B, but its critical thickness dimension will essentially correspond to the thickness $t_0$ shown in FIG. 1. As noted above, the most efficient way of manufacturing the pressure transducer 10 is accomplished by forming multiple silicon diaphragms on a large silicon wafer and providing multiple glass bases 12 on a large glass substrate wherein this type of batch processing is essentially illustrated in the Myers '899 patent.

A process step 103 comprises anodically bonding the silicon diaphragm 11 to the glass base 12 such that a pressure transducer is provided with at least one electrical property (capacitance) of the pressure transducer being varied in accordance with the deflection of the diaphragm 11 with respect to the base 12 in response to sensed pressure P. As previously explained, this deflection results in altering the distance d shown in FIG. 1 and thereby altering the capacitance provided between the output connections 16 and 17.

After the diaphragm 11 and base 12 have been bonded to each other, preferably by an anodic bonding process, a measurement of the initial capacitance of the transducer is taken at normal atmospheric pressure corresponding to the pressure P being 0 kilopascals. This corresponds to process step 104. Preferably, since the initial thickness $t_0$ of the silicon diaphragm is actually too thick for any meaningful deflection of the diaphragm 11 with respect to the base 12, an initial or first etch of the diaphragm 11 for a predetermined time duration is implemented by a process step 105. The etching occurs by the use of a potassium hydroxide solution which etches the silicon diaphragm 11 while providing a negligible etching effect with respect to the glass base 12. Subsequently, a measurement of the transducer capacitance in response to a predetermined reference pressure of 100 kilopascals is accomplished by a process step 106. By noting the initial capacitance in step 104 and the capacitance produced in response to a known different pressure as per step 106, the pressure sensitivity of the transducer 10 can be calculated. It should be noted that in some situations the first etching step 105 may not be necessary if the initial diaphragm thickness $t_0$ does not prevent a substantial deflection of the diaphragm towards the base electrode 14. This alternate process is generally illustrated by the alternate path A shown in FIG. 2. However, when performing this alternate path A, it should be noted that the measurement pressure in step 104 should preferably be the pressure that results in the diaphragm being substantially parallel to the base top surface. Also, step 105, if performed, could occur prior to step 104, but after step 103, without any adverse affect or substantial change to the present invention as long as the step 104 preferably occurs with the diaphragm substantially parallel to the base top surface.

After process step 106, the flowchart 100 passes to a summing terminal 107 and from there, preferably onto a process step 108 which involves effectively calculating the necessary diaphragm thickness reduction, and therefore the etching time, required for providing the desired pressure sensitivity for the transducer 10. The process step 108 essentially involves: (1) utilizing the measured pressure sensitivity of the transducer as calculated from the steps 104 and 106; (2) recognizing the amount of thickness reduction of the critical dimension t of the silicon diaphragm which will occur in response to etching the diaphragm 11 with potassium hydroxide for a predetermined time; and (3) calculating (estimating) how much etching time will be required so as to alter the existing thickness of the diaphragm of the pressure transducer to obtain a desired reduced thickness diaphragm so as to implement a desired pressure sensitivity. This calculation essentially involves correlating a change in pressure sensitivity with respect to a change in diaphragm thickness t. This correlation could be empirically obtained by the process B shown dashed in FIG. 2 as exiting from the summing terminal 107, executing process steps 109 and 110 and returning to the summing terminal 107. However, preferably this correlation is obtained by just experience gained in executing the flowchart 100 several times without path B.

Process step 109 essentially involves etching the silicon diaphragm 11 with potassium hydroxide for a predetermined known time and, then process step 110 involves again measuring the capacitance of the pressure transducer at the referenced pressure of 100 kilopascals. The process steps 109 and 110, in combination with the process steps 104 and 106, provide an effective determination of what change in diaphragm thickness, as measured by a etching time duration of the diaphragm, resulted in what change in pressure sensitivity. Knowing this information by either executing the path B each time the process 100 is performed, or executing the process path B only occasionally, will provide enough data so that the calculation step 108 can be accurately implemented. In fact, preferably just experience gained in executing the flowchart 100 several times, without the path B, can provide sufficient data for substantially accurately predicting what change in existing diaphragm thickness is required to obtain a desired sensitivity. This then translates into what etch time duration is needed. It should be noted that the effective calculation of step 108 comprises calculating a quantity corresponding to the desired amount of diaphragm thickness reduction needed to achieve a desired transduced pressure sensitivity. This calculated quantity can be either the amount of needed thickness reduction or the amount of etching time needed to achieve the desired thickness reduction.

After the process step 108, process step 111 is reached which involves sorting all of the transducers which require substantially similar calculated each times for the final (second) etch step of the present invention. Thus, for example, if some transducers require a 20-second etch of the diaphragm, while other transducers require a 10-second etch, all the transducers requiring the 10-second etch will be batch processed in an etching tank for implementing the 10-second etch, whereas the transducers requiring a 20-second etch will be batch processed so as to implement a 20-second silicon diaphragm etch. Thus, step 111 results in sorting the pressure transducers according to what sort of each time/thickness reduction has been calculated such that each transducer will have the desired pressure sensitivity.

After the sorting step 111, a second silicon diaphragm etch step 112 is implemented wherein the time duration for the etching provided by the step 112 is accomplished in accordance with the calculated etch time/thickness reduction provided by the step 108. It should be noted that the calculated etch time utilized in the step 112 is a function of the previously-measured pressure sensitivity of the capacitive pressure transducer 10 since that is how the calculation step 108 calculates the desired etch time. Also, while etching is the preferred technique for diaphragm thickness reduction, grinding might also be useable for step 112. In either case, the thickness reduction occurs while the diaphragm remains bonded to its associated base.

After the second etch step 112, the flowchart 100 passes to a decision step 113 in which the etched transducer, now presumably having a desired thickness t such that a desired pressure sensitivity is achieved, is tested in an effective final test of pressure sensitivity. It should be noted that therefore the decision step 113 includes an implied measuring step since the step 113 determines if the pressure transducer 10 provides a capacitance, in response to a predetermined pressure, which illustrates that the desired pressure sensitivity of the transducer 10 has been achieved. If the sensitivity is satisfactory, the flowchart passes to a step 114 in which all the transducers having the desired sensitivity are then utilized in pressure sensor assemblies which include a pressure sensing element corresponding to the pressure transducer 10. If the decision step 113 determines that the transducer sensitivity is not the desired transducer sensitivity, the flowchart then passes to a decision step 115 which determines if any additional etching of the silicon diaphragm 11 can provide the desired sensitivity. If so, then the flowchart proceeds back to the summing terminal 107 wherein the step 108 then determines how much additional etching time is required, and steps 111, 112 and 113 are performed again. If the decision step 115 determines that it is no longer possible to reduce the thickness of the silicon diaphragm, due to over-etching, to obtain a desired pressure sensitivity, then the transducer is disposed of as per step 116.

It should be noted that if providing a single silicon wafer with a number of diaphragms 11 is contemplated, then the measuring steps 104 and 106 may not have to be performed on each individual diaphragm on a wafer, but may correspond to just sampling some of the pressure transducers which have their diaphragms as part of a single large wafer. However, it is preferred that the decision block 113 will actually implement an individual pressure sensitivity test for each individual pressure transducer such that only those transducers which have the desired pressure sensitivity will be allowed to pass on to step 114. Thus, the decision block 113 includes an implied step of marking any pressure transducers on a single wafer which do not meet the pressure sensitivity requirements such that those devices will not be utilized by the process step 114. In addition, if providing individual transducers as part of larger wafers is contemplated, the step 114 would also include scribing the wafers so as to extract the individual pressure transducers which meet the desired pressure sensitivity requirements.

While specific embodiments of the present invention have been shown and described, further modifications and improvements will occur to those skilled in the art. All such modifications which retain the basic underlying principles disclosed and claimed herein are within the scope of this invention.

We claim:

1. A process for manufacturing a sensor comprising the steps of:
   providing a transducer by bonding a flexible diaphragm to a base to form said transducer with a cavity being between said diaphragm and base, at least one electrical property of said transducer being varied in accordance with deflection of said diaphragm with respect to said base in response to sensed force applied to said diaphragm;
   applying at least one predetermined force to said transducer;
   measuring said at least one electrical property of said transducer provided in response to said predetermined force resulting in a deflection of said diaphragm with respect to said base;
   calculating, based upon at least said measured at least one electrical property, a quantity corresponding to an amount of thickness reduction of said diaphragm needed to obtain a desired transducer characteristic by altering the flex characteristic of said diaphragm with respect to said base; and then
   thinning said transducer diaphragm by removing a portion of said diaphragm from a diaphragm surface external and nonadjacent to said cavity, while said diaphragm is bonded to said base substrate, to reduce the thickness of said diaphragm and thereby alter the flex characteristic of said diaphragm to achieve said desired transducer characteristic, wherein parameters of this thinning step are determined in accordance with said calculated quantity which in turn is determined in accordance with said measured at least one electrical property of said transducer.

2. A sensor manufacturing process according to claim 1 wherein said diaphragm comprises a silicon substrate.

3. A sensor manufacturing process according to claim 2 wherein said base comprises a glass base substrate.

4. A sensor manufacturing process according to claim 3 wherein said thinning step comprises utilizing potassium hydroxide so as to etch said silicon diaphragm while providing a negligible etching effect on said glass base.

5. A sensor manufacturing process according to claim 4 wherein said transducer comprises a sensing capacitance transducer in which said at least one electrical property of said transducer comprises capacitance and/or changes in capacitance produced in response to sensed force, said process including the step of providing capacitor electrode on each of said diaphragm and base separated by and directly adjacent said cavity, said transducer capacitance corresponding to the capacitance between said capacitor electrodes.

6. A sensor manufacturing process according to claim 1 which includes the steps of, prior to said previously recited measuring and thinning steps, initially measuring at least said one electrical property of said transducer and initially etching said diaphragm, while said diaphragm is bonded to said base, for a predetermined time duration, wherein said step of thinning said diaphragm in accordance with measured transducer electrical property provided in response to said predetermined force represents an additional etching step of said diaphragm after said initial etching step.

7. A sensor manufacturing process according to claim 6 which includes the step of measuring, after said additional etching step, at least said one electrical property of said transducer provided in response to a predetermined force.

8. A sensor manufacturing process according to claim 7 wherein said predetermined time for said initial etching step is independent of said initially-measured electrical property of said transducer.

9. A sensor manufacturing process according to claim 1 wherein said parameters for said thinning step include at least a time duration for thinning said diaphragm which duration is calculated in accordance with at least said measured one electrical property of said transducer.

10. A sensor manufacturing process according to claim 9 which includes the step of, prior to said thinning step, providing a multiplicity of transducers sorting said transducers which require thinning their diaphragms for similar time durations that are calculated in accordance with said measured one electrical property such that said thinning step is accomplished by batch process thinning of a number of transducers which have been calculated as requiring similar thinning time durations.

11. A process for manufacturing a pressure sensor comprising the steps of:
    providing a pressure transducer by bonding a flexible diaphragm to a base to form said transducer with a cavity being between said diaphragm and base, at least one electrical property of said pressure transducer being varied in accordance with deflection of said diaphragm with respect to said base in response to sensed fluid pressure applied to said diaphragm;
    applying at least one predetermined fluid pressure to said transducer;
    measuring said at least one electrical property of said transducer provided in response to said predetermined fluid pressure resulting in a deflection of said diaphragm with respect to said base;
    calculating, based upon at least said measured one electrical property, a quantity corresponding to an amount of thickness reduction of said diaphragm needed to obtain a desired transducer characteristic by altering the flex characteristic of said diaphragm with respect to said base; and then
    etching a surface of said transducer diaphragm external and adjacent to said cavity, while said diaphragm is bonded to said base substrate, to reduce the thickness of said diaphragm, and thereby alter the flex characteristic of said diaphragm to achieve said desired transducer characteristic, wherein parameters of this etching step are determined in accordance with said calculated quantity which in turn is determined in accordance with said measured at least one electrical property of said transducer.

12. A sensor manufacturing process according to claim 11 wherein said diaphragm comprises a silicon substrate.

13. A sensor manufacturing process according to claim 12 wherein said base comprises a glass base substrate.

14. A sensor manufacturing process according to claim 13 wherein said step of etching comprises utilizing potassium hydroxide so as to etch said silicon diaphragm while providing a negligible etching effect on said glass base.

15. A sensor manufacturing process according to claim 14 wherein said pressure transducer comprises a pressure sensing capacitance transducer in which said at least one electrical property of said transducer comprises capacitance and/or changes in capacitance produced in response to sensed pressure, said process including the step of providing capacitor electrodes on each of said diaphragm and base separated by and directly adjacent said cavity, said transducer capacitance corresponding to the capacitance between said capacitor electrodes.

16. A sensor manufacturing process according to claim 11 which includes the steps of, prior to said previously recited measuring and etching steps, initially measuring at least said one electrical property of said transducer and initially etching said diaphragm, while said diaphragm is bonded to said base, for a predetermined time duration, wherein said step of etching in accordance with measured transducer electrical property provided in response to said predetermined pressure represents an additional etching step of said diaphragm after said initial etching step.

17. A sensor manufacturing process according to claim 16 which includes the step of measuring, after said additional etching step, at least said one electrical property of said transducer provided in response to a predetermined pressure.

18. A sensor manufacturing process according to claim 11 wherein said parameters for said etching step include at least a time duration for etching said diaphragm which duration is calculated in accordance with at least said measured one electrical property of said transducer.

19. A process for manufacturing sensors comprising the steps of:
providing a plurality of transducers by bonding a single wafer flexible diaphragm to a base to form said plurality of transducers, each transducer having an associated cavity between an associated portion of said diaphragm and said base, at least one electrical property of each of said transducers being varied in accordance with deflection of said diaphragm with respect to said base in response to sensed fluid pressure applied to said diaphragm;
applying at least one predetermined fluid pressure to said transducers;
measuring said at least one electrical property of at least one of said transducers provided in response to said predetermined fluid pressure resulting in a deflection of said associated portions of said diaphragm with respect to said base;
calculating, based upon at least said measured at least one electrical property, a quantity corresponding to an amount of thickness reduction of said diaphragm wafer needed to obtain a desired transducer characteristic for said plurality of transducers by altering the flex characteristic of said diaphragm with respect to said base; and then
thinning said transducers diaphragm by removing a portion of said diaphragm wafer from a diaphragm surface external and nonadjacent to said cavity, while said diaphragm is bonded to said base substrate, to reduce the thickness of said diaphragm and thereby alter the flex characteristic of said diaphragm to simultaneously achieve said desired transducer characteristic for said plurality of transducers, wherein parameters of this thinning step are determined in accordance with said calculated quantity which in turn is determined in accordance with said measured at one least electrical property of said transducer.

20. A sensor manufacturing process according to claim 19 wherein each of said transducers comprise a sensing capacitance transducer in which said at least one electrical property of said transducer comprises capacitance and/or changes in capacitance produced in response to sensed force, said process including the step of providing capacitor electrodes on each of said diaphragm and base separated by and directly adjacent each of said associated cavities, said transducer capacitance corresponding to the capacitance between said capacitor electrodes.

* * * * *